Aug. 13, 1929.  W. M. MOXLEY  1,724,503
AUTOMATIC CONTROL MECHANISM FOR MOTOR VEHICLES
Filed Jan. 16, 1928  2 Sheets-Sheet 2

INVENTOR.
WILLIAM M. MOXLEY,
BY
Shepherd & Campbell
ATTORNEYS

Patented Aug. 13, 1929.

1,724,503

UNITED STATES PATENT OFFICE.

WILLIAM M. MOXLEY, OF MARCELINE, MISSOURI.

AUTOMATIC CONTROL MECHANISM FOR MOTOR VEHICLES.

Application filed January 16, 1928. Serial No. 247,174.

This invention relates to an automatic control mechanism for motor vehicles, such as automobiles, motor trucks, and the like, and it has for its object to provide improvements in the mechanism of Patent 1,636,064, issued to me on the 19th day of July, 1927.

Like the structure of the patent referred to, the mechanism of the present invention is so constructed and arranged that when the vehicle to which it is applied reaches a predetermined degree of speed, the fuel supply to the engine of the same will be shut off, and if the speed of the vehicle increases beyond the point at which the fuel is shut off, such further increase of speed will result in the application of the brakes of the vehicles.

Further objects and advantages of the invention will be set forth in the detailed description which follows.

Like numerals designate corresponding parts throughout the several figures of the drawing.

Figure 1:
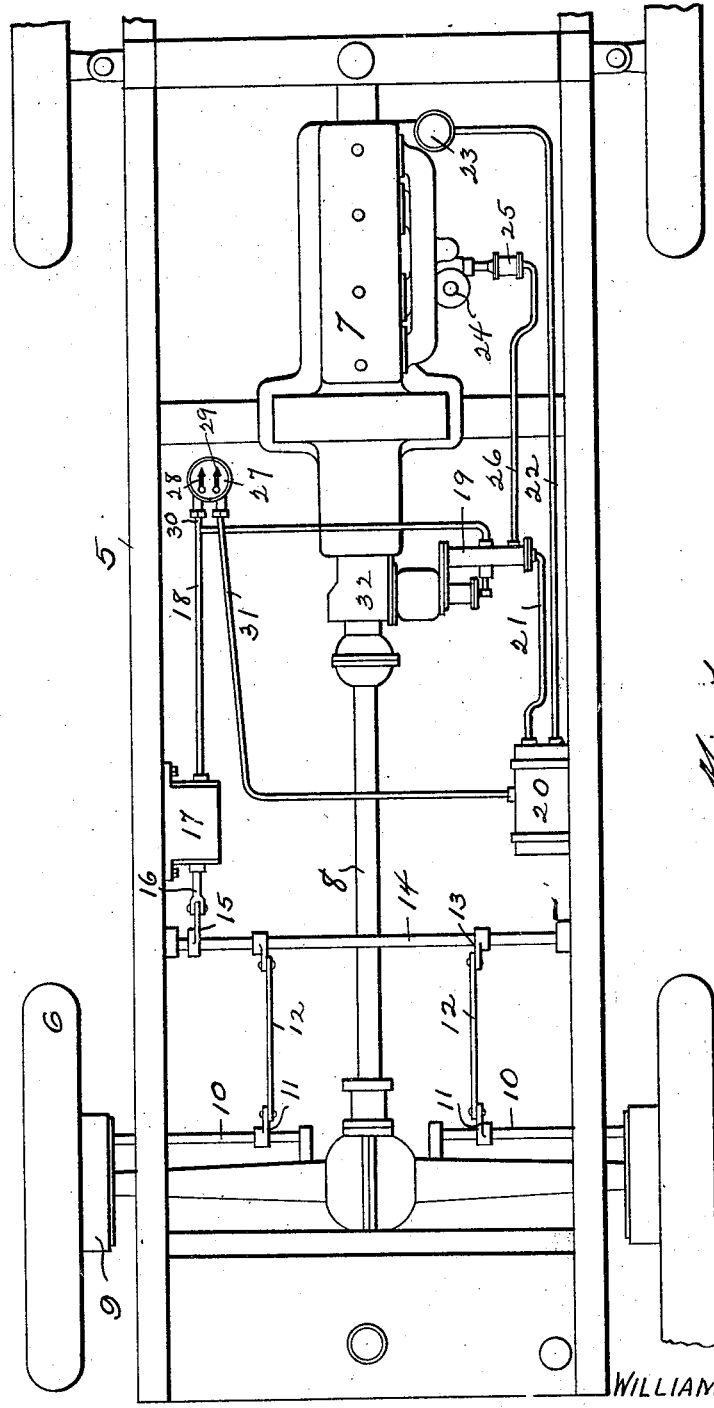
Fig. 1 is a diagrammatic plan view of a part of a motor driven vehicle, having the invention applied thereto.
Figure 2:
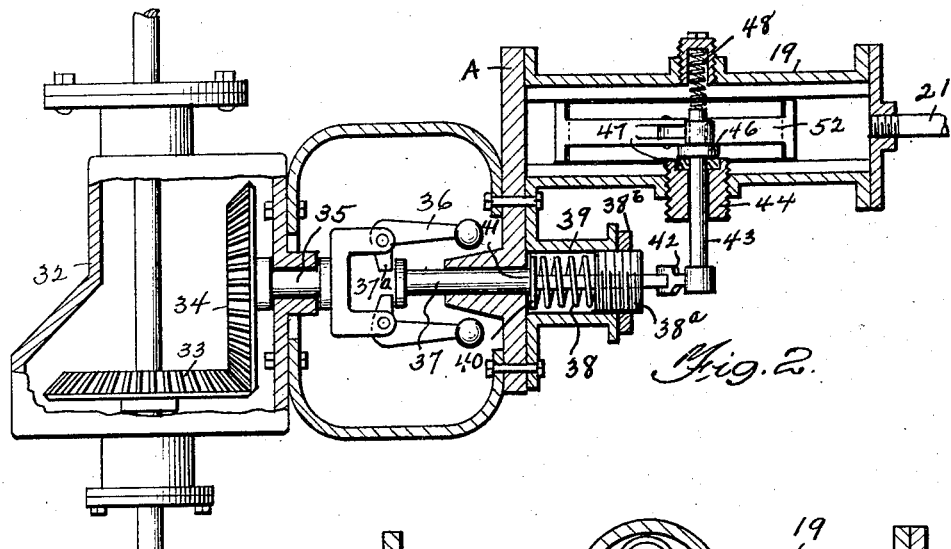
Fig. 2 is a sectional view through the governor controlled valve mechanism, hereinafter described.
Figure 3:
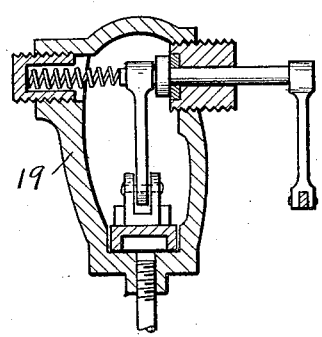
Fig. 3 is a transverse sectional view through the valve casing of Fig. 2.

Referring to the diagrammatic Figure 1, 5 designates the chassis, 6 the ground wheels, 7 the engine and 8 the usual longitudinally extending drive shaft of a motor vehicle. The brakes 9 are operated by rock shafts 10, through the medium of cranks 11, and rods 12. The forward ends of these rods are connected to crank arms 13, on a transverse rock shaft 14. This rock shaft is, in turn, operated by crank arm 15 and piston rod 16, of an air brake cylinder 17.
Air is delivered to the forward end of the air brake cylinder through a pipe line 18, under certain conditions, as hereinafter described, said pipe line leading from said cylinder to valve casing 19. The air is delivered to said valve casing from a reservoir 20, through pipe line 21, and this reservoir, in turn, receives its air supply through pipe line 22, from an engine driven pump or air compressor 23. The carburetor of the engine is indicated at 24, and has associated therewith a chamber 25, containing an air operated fuel shut-off mechanism, hereinafter described. This chamber receives its air supply through a pipe line 26, from the valve casing 19, under certain conditions.

I preferably employ a duplex gauge 27, having two hands 28 and 29, one of which indicates the pressure in the brake cylinder line, through a pipe 30, and the other of which indicates the pressure in the reservoir, through a pipe 31. The parts so far described are like those of my prior patent, above referred to, and, consequently, require no further description.

Figure 4:
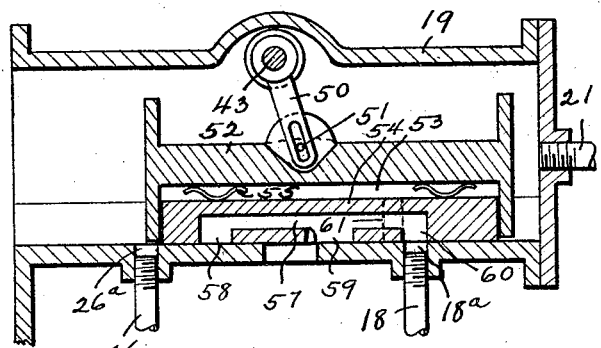
Fig. 4 is a longitudinal sectional view through the valve casing.
Figure 6:
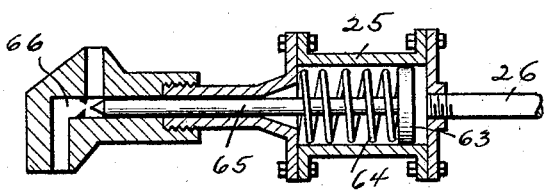
Fig. 6 is a horizontal sectional view through the pressure operated fuel shut-off mechanism, hereinafter described.
Figure 5:
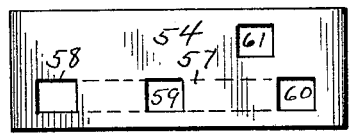
Fig. 5 is an underside face view of the valve.

The main drive shaft 8 passes through a housing 32, and carries a bevel pinion 33, which drives to a corresponding pinion 34, upon the governor shaft 35. The governor is of the centrifugal type, comprising the weighted arms 36, having tails $37^a$, which, when said arms are thrown outwardly under the influence of centrifugal force, act upon a plunger 37, to thrust said plunger outwardly. Outward movement of the plunger is against the action of a spring 38, which is mounted in a cylinder 39. The spring thrusts against a washer 40, and this washer, in turn, thrusts against a shoulder 41, of the plunger. At its outer end the spring bears against an adjusting nut $38^a$, which is provided with a lock nut $38^b$. Adjustment of this nut $38^a$, adjusts the tension of the spring and, consequently, determines the speed of the vehicle, at which the plunger 37 will move outwardly to a predetermined degree. The outer end of the plunger is engaged with the forked end of a crank arm 42, which is fast upon a rock shaft 43. This rock shaft is journaled in a bearing thimble 44, of a valve casing 19. The rock shaft is provided with a shoulder or collar 46, which is thrust against a leather or other soft washer 47, by the action of a spring 48, and also by the action of the air in the valve casing. This arrangement is provided to effect an air-tight mounting for the rock shaft 43. At its inner end rock shaft 43 carries a crank arm 50, that is slotted at its lower end for engagement with a pin 51, that is carried by a longitudinally movable spider 52. This spider is provided with a cavity in its under side, as indicated at 53, which receives a slide valve 54. Springs 55 bear between the under side of the spider and the slide valve, and thrust the lower face of the slide valve into tight engagement with the bottom of the valve cylinder 19. The slide valve is substantially the same as that illustrated in my patent above referred to. That is, it comprises a longitudinally extending port 57, which communicates with the lower face of the valve through ports 58, 59 and 60. An additional port 61 passes completely through the valve at a point to one side of the line of the other ports. It is clear that the action of the plunger 37 will result in rocking the shaft 43 about its axis, and will result in moving the valve outwardly in its casing 19, on toward the right in Figure 4. In the initial movement of the valve toward the right, a port 26ª will first be uncovered to admit air from pipe 21, which enters at the end of the casing 19, to pipe 26. The air flowing through pipe 26 enters a chamber or cylinder 25, and acts upon a piston 63 therein, to thrust said piston inwardly against the action of a spring 64, and to move a valve stem 65, to the left in Figure 5, to close the passage 66, which is the fuel supply passage of the carburetor 24. The result of this is to cut off the supply of fuel to, and to stop the engine of the vehicle. If, by reason of the fact that the vehicle is on a down grade, or if, by reason of the fact that the driver is reckless, and throws his clutch out to permit the vehicle to coast, disconnected from the engine, the speed of the vehicle continues to increase, the valve will move further to the right in Figure 4, to bring the port 61 into alignment with a port 18ª, and air will flow through said port 61, port 18ª, and pipe 18, to the brake cylinder 17, with the result that the brakes will be applied. The port 18ª is elongated laterally enough to lie within the path of ports 60 and 61 (as shown in my prior patent). When port 60 is aligned with port 18ª, the brake cylinder is in communication with the atmosphere through said port 60, longitudinal passage-way 57, port 59, and an exhaust port 67 of the casing 19, and when the slide valve is moved to its limit of movement toward the left in Figure 4, the said slide valve will have cut off the passage of air to pipe 26, and vented said pipe, and, consequently, cylinder 62, to the atmosphere, by aligning port 58 with port 26ª, and port 59 with exhaust port 67.

It is to be observed that the new arrangement is a very simple, compact and positive one. The air cylinder 19 and the spring containing cylinder 39 are mounted upon a common supporting plate A, in such manner that plunger 37 may efficiently act upon the valve, in the shifting of the same.

It is to be understood that the invention is not limited to the precise construction set forth, but that it includes within its purview whatever changes fairly come within either the terms or the spirit of the appended claims.

Having described my invention, what I claim is:

1. An automatic controlling valve for motor vehicles, for use in structures which cut off supply of fuel to the engine of the motor vehicle upon an initial increase in speed and apply the brakes upon a further increase in speed, comprising a centrifugally operated governor, a plunger movable endwise thereby, a cylinder through which said plunger passes, a spring in said cylinder, a tubular adjusting nut threaded into said cylinder, and bearing upon said spring, through which said plunger passes, an air cylinder, a valve movable longitudinally in said air cylinder, a transversely disposed rock shaft lying at right angles to said plunger, a crank arm for the outer end of the rock shaft with which the outer end of the plunger is engaged, and a crank arm upon the inner end of the rock shaft, the free end of which engages and moves said valve.

2. A structure as recited in claim 1, in combination with spring means thrusting said rock shaft laterally, and a packing washer against which the rock shaft bears to form an air-tight joint.

3. An automatic controlling valve for motor vehicles, for use in structures which cut off supply of fuel to the engine of the motor vehicle upon an initial increase in speed and applies the brakes upon a further increase in speed, comprising a centrifugal governor and a casing therefor, a plate constituting a part of said casing, a pair of cylinders mounted upon said plate, in parallelism with each other, a plunger operated by the centrifugal governor passing through one of said cylinders, a spring in the last named cylinder, means for adjusting the thrust of said spring, a slide valve in the other of said cylinders, means for supplying air to the last named cylinder, a spider engaging said slide valve, a crank arm engaged with said spider, a transversely extending rock shaft by which the crank arm is carried, and a second crank arm upon the outer end of said rock shaft, the last named crank arm being engaged with the outer end of said plunger.

4. An automatic controlling valve for motor vehicles for use in structures which cut off supply of fuel to the engine of the motor vehicle upon an initial increase in speed, and apply the brakes upon a further increase in speed, comprising a centrifugally operated governor, a plunger movable endwise thereby, an air cylinder disposed to one side of the line of travel of the plunger, a valve movable longitudinally in said air cylinder, a transversely disposed rock shaft lying at right angles to said plunger, a crank arm on the outer end of the rock shaft with which the outer end of the plunger is engaged, and a crank arm upon the inner end of the rock shaft and within the air cylinder, the free end of which engages and moves said valve, as and for the purposes set forth.

In testimony whereof I affix my signature.

WILLIAM M. MOXLEY.